R. J. WIGLEY.
HANDY HOOK.
APPLICATION FILED NOV. 7, 1912.

1,072,285.

Patented Sept. 2, 1913.

Witnesses
J. Milton Jester
Roszelle Duffie

Inventor
Robt. J. Wigley.
By
Attorney

COLUMBIA PLANOGRAPH CO., WASHINGTON, D. C.

UNITED STATES PATENT OFFICE.

ROBERT JAMES WIGLEY, OF CENTRALIA, WASHINGTON.

HANDY HOOK.

1,072,285.  Specification of Letters Patent.  Patented Sept. 2, 1913.

Application filed November 7, 1912. Serial No. 729,975.

*To all whom it may concern:*

Be it known that I, ROBERT JAMES WIGLEY, a citizen of the United States, residing at Centralia, in the county of Lewis and State of Washington, have invented certain new and useful Improvements in Handy Hooks, of which the following is a specification.

My invention has relation to new and useful improvements in handy hooks and attachment thereto, and the main object of the invention is to provide a device of this nature that will be a handy hook for wagon boxes.

Figure 1:
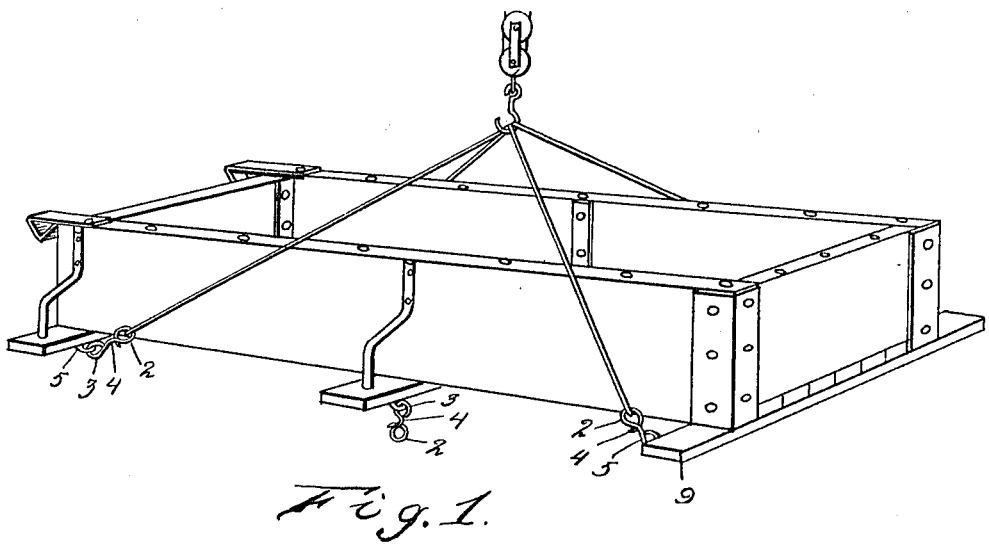

A further object of my invention is to produce a hook that will be handy for farmers in tying covers of any kind over grain camp wagons, handy in saving the wagon box from being pulled to pieces and handy in moving wagon boxes from beds (see Fig. 1).

A further function of my invention is to provide a hook that will be adapted to be used to prevent loads from falling from wagons and especially loads of hay or straw. Furthermore this hook is handy in tying stock to go to market, for tying horses together or for hitching them to any place—and in fact the many useful purposes to which it is adapted are too numerous to mention.

With the foregoing and other objects in view, my invention consists of the novel features of construction, combination and arrangement of parts as are described in this specification, illustrated in the accompanying drawings forming a part thereof, and particularly pointed out in the claims hereunto appended.

Figure 2:
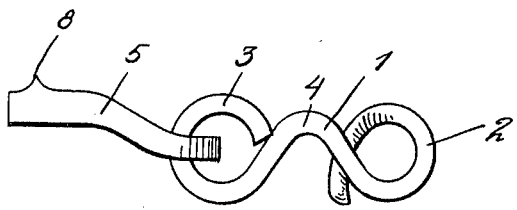
Figure 3:
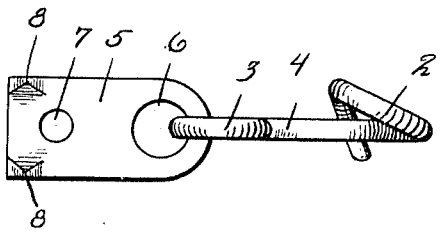

Reference being had to the drawings, Figure 1 is a perspective view of a wagon bed to which my improved hook has been applied; Fig. 2 is a side elevation of said hook and attachment; Fig. 3 is a top plan view of the hook and attachment.

Referring more particularly to the drawings, in which like numerals designate like parts throughout, my invention is described as follows:—The hook is formed of one continuous piece of metal wire bent in the form of a double loop, said loops being indicated by the numerals 2 and 3. Interposed between the loops is a decided hump 4, said loops being separated thereby. From the hump the metal curves downward in each direction, when it curves upwardly and inwardly, the terminals of the metal terminating adjacent to said hump 4. In the case of the loop 3, it will be pointed out that the terminal of this loop contacts or practically contacts the hump so that the attachment 5 held thereby, through an opening 6 of which the loop 3 passes cannot become detached. The terminal of the loop 2 while adjacent to the hump is off to one side and extends below the same, leaving a space therebetween for the reception of a ring or the like. (See Fig. 1.) The attachment or member 5 is substantially rectangular in shape and is provided with a perforation 7 therein adjacent the opposite end adjacent to which the opening 6 is located. Prongs or teeth 8 are provided integral with the member and are arranged adjacent the perforation 7, the object of said teeth being to cause the member to obtain a firm grasp upon the cross-piece 9 (or other object to which attached) and also prevent rotation thereof.

Although I have specifically described the novel features of construction, combination and arrangement of my invention, yet I do not confine myself to such specific construction, combination and arrangement of parts but reserve and may exercise the right to make such changes therein as do not depart from the spirit of the invention or the scope of the claims hereunto appended.

Having described my invention what I claim as new, is:—

1. A hook of the kind described comprising one continuous piece of metal wire, bent in the form of a double loop, said loops being separated by a hump.

2. A hook of the class described comprising one continuous piece of metal bent in the form of a double loop, a hump separating said loops, said metal curving from the hump, first downward in each direction, when it curves upwardly, the terminals of said wire terminating adjacent said hump, one of said terminals contacting said hump, while a space is left between the terminal of the other loop and the hump.

3. A hook and attachment of the class described comprising one continuous piece of metal bent in the form of a double loop, a hump separating said loops, said metal curving from the hump, first downward in each direction, when it curves upwardly, the terminals of said wire terminating adjacent said hump, one of said terminals contacting said hump, while a space is left between the terminal of the other loop and the hump, an attachment connected to that loop which is closed by contacting or substantially contacting the hump, said attachment being adapted to be attached to any wooden object, and means provided thereon whereby the same may be caused to firmly grip the object to which attached.

4. A hook of the class described comprising one continuous piece of metal bent in the form of a double loop, a hump separating said loops, said metal curving from the hump, first downward in each direction when it curves upwardly, the terminals of said wire terminating adjacent said hump, one of said terminals contacting said hump, while a space is left between the terminal of the other loop and the hump, the terminal of the last named loop extending to the side and below the hump.

5. A hook and attachment of the kind described comprising one continuous piece of metal wire, bent in the form of a double loop, a hump separating the loops, an attachment connected to one of the loops, said attachment being substantially rectangular in shape, and being provided with prongs and a perforation therein to enable it to be firmly secured to any wooden object desired.

In testimony whereof I affix my signature in presence of two witnesses.

ROBERT JAMES WIGLEY.

Witnesses:
A. I. ZIMMERMAN,
W. D. HASTINGS.

---

Copies of this patent may be obtained for five cents each, by addressing the "Commissioner of Patents, Washington, D. C."